United States Patent
Goral et al.

(10) Patent No.: US 12,480,080 B2
(45) Date of Patent: Nov. 25, 2025

(54) ASEPTIC BIOPROCESS PACKAGE

(71) Applicant: CORNING INCORPORATED, Corning, NY (US)

(72) Inventors: Vasiliy Nikolaevich Goral, Painted Post, NY (US); Ryann Loren Russell, Drexel Hill, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/901,338

(22) Filed: Sep. 1, 2022

(65) Prior Publication Data
US 2022/0411737 A1   Dec. 29, 2022

Related U.S. Application Data

(62) Division of application No. 16/497,518, filed as application No. PCT/US2018/022768 on Mar. 16, 2018, now abandoned.
(Continued)

(51) Int. Cl.
*C12M 1/00* (2006.01)
*A61J 1/10* (2006.01)
(Continued)

(52) U.S. Cl.
CPC ............... *C12M 23/14* (2013.01); *A61J 1/10* (2013.01); *A61J 1/1418* (2015.05); *A61J 1/1462* (2013.01);
(Continued)

(58) Field of Classification Search
None
See application file for complete search history.

(56) References Cited

U.S. PATENT DOCUMENTS 4,138,036 A    2/1979  Bond
4,939,151 A *  7/1990  Bacehowski ......... C12M 23/26
                                          435/402
(Continued)

FOREIGN PATENT DOCUMENTS

CN    2347982 Y    11/1999
CN    1791439 A    6/2006
(Continued)

OTHER PUBLICATIONS

"Improve Productivity and Reliablity of Your Critical Upstream Operations by Investing in the Right Cell Culture Technology Solutions"; Cell Culture—Biotech; Pall Corporation; 3 Pages (2019) http://www.pall.com/main/biopharmaceuticals/solohill-microcarriers.page?
(Continued)

*Primary Examiner* — Holly Kipouros
(74) *Attorney, Agent, or Firm* — Chandra J. Duncan

(57) ABSTRACT

An aseptic bioprocess package is provided herein. The aseptic bioprocess package includes a 2D flexible container including an interior compartment, a height having an upper half and a lower half, an inlet and an outlet, the inlet and the outlet being disposed on the same half of the 2D flexible container and a channel-forming feature in the interior compartment of the container, the channel-forming feature being configured to maintain a fluid flow path that fluidly connects the interior compartment of the flexible container with the outlet.

30 Claims, 10 Drawing Sheets

Related U.S. Application Data

(60) Provisional application No. 62/640,097, filed on Mar. 8, 2018, provisional application No. 62/477,647, filed on Mar. 28, 2017.

(51) Int. Cl.
*A61J 1/14* (2023.01)
*B01L 3/00* (2006.01)
*C12N 5/00* (2006.01)

(52) U.S. Cl.
CPC .............. *A61J 1/1487* (2015.05); *B01L 3/505* (2013.01); *C12N 5/0075* (2013.01); *B01L 2200/0689* (2013.01); *B01L 2300/042* (2013.01); *B01L 2300/0877* (2013.01); *B01L 2300/12* (2013.01); *B01L 2300/123* (2013.01)

(56) References Cited

U.S. PATENT DOCUMENTS

| | | | |
|---|---|---|---|
| 5,114,855 A | 5/1992 | Hu et al. | |
| 5,749,493 A | 5/1998 | Boone et al. | |
| 5,941,866 A * | 8/1999 | Niedospial, Jr. | A61J 1/1412 604/408 |
| 6,179,823 B1 * | 1/2001 | Niedospial, Jr. | A61J 1/10 604/408 |
| 6,432,698 B1 * | 8/2002 | Gaugler | C12M 23/28 435/296.1 |
| 2007/0256971 A1 * | 11/2007 | Roos | A01C 3/023 210/603 |
| 2008/0140047 A1 | 6/2008 | Young | |
| 2008/0274536 A1 | 11/2008 | Hatano et al. | |
| 2010/0015696 A1 | 1/2010 | Claes et al. | |
| 2011/0070648 A1 | 3/2011 | Anneren et al. | |
| 2011/0085748 A1 * | 4/2011 | Turvey | B65D 81/2023 383/105 |
| 2011/0189764 A1 * | 8/2011 | Starbard | C12M 23/28 435/307.1 |
| 2012/0214659 A1 | 8/2012 | Do et al. | |
| 2012/0238011 A1 | 9/2012 | Tuohey et al. | |
| 2013/0026167 A1 * | 1/2013 | Kusz | B65D 39/04 53/485 |
| 2013/0084030 A1 | 4/2013 | Staheli et al. | |
| 2014/0011270 A1 | 1/2014 | Chotteau et al. | |
| 2014/0196791 A1 | 7/2014 | Lee et al. | |
| 2014/0287512 A1 | 9/2014 | Kaisermayer et al. | |
| 2015/0125930 A1 | 5/2015 | Gebauer et al. | |
| 2015/0322399 A1 | 11/2015 | Purushothaman et al. | |
| 2016/0145567 A1 | 5/2016 | Henry et al. | |
| 2017/0073624 A1 * | 3/2017 | Stankowski | C12M 23/34 |
| 2018/0171301 A1 | 6/2018 | Dolley-Sonneville et al. | |
| 2018/0291326 A1 | 10/2018 | Lundgren et al. | |
| 2018/0298316 A1 | 10/2018 | Lock et al. | |
| 2019/0010435 A1 * | 1/2019 | Norderhaugh | B01L 3/505 |

FOREIGN PATENT DOCUMENTS

| | | |
|---|---|---|
| CN | 101460605 A | 6/2009 |
| CN | 102741391 A | 10/2012 |
| CN | 103415610 A | 11/2013 |
| CN | 103534344 A | 1/2014 |
| JP | 55-063854 U | 5/1980 |
| JP | 60-099858 A | 6/1985 |
| JP | 63-076653 U | 5/1988 |
| JP | 03-040959 U | 4/1991 |
| JP | 04-041848 U | 4/1992 |
| WO | 2012/128703 A1 | 9/2012 |
| WO | 2012/158108 A1 | 11/2012 |
| WO | 2016/188781 A1 | 12/2016 |
| WO | 2017/019590 A1 | 2/2017 |

OTHER PUBLICATIONS

International Search Report and Written Opinion of the International Searching Authority; PCT/US2018/022768; Mailed Jun. 12, 2018; 12 Pages; European Patent Office.
Japanese Patent Application No. 2019-522947, Office Action dated Dec. 22, 2021, 14 pages (7 pages of English Translation and 7 pages of Original Copy); Japanese Patent Office.
Chinese Patent Application No. 201880033639.6, Office Action, dated Aug. 29, 2022, 14 pages (7 pages of English Translation and 7 pages of Original Copy); Chinese Patent Office.

* cited by examiner

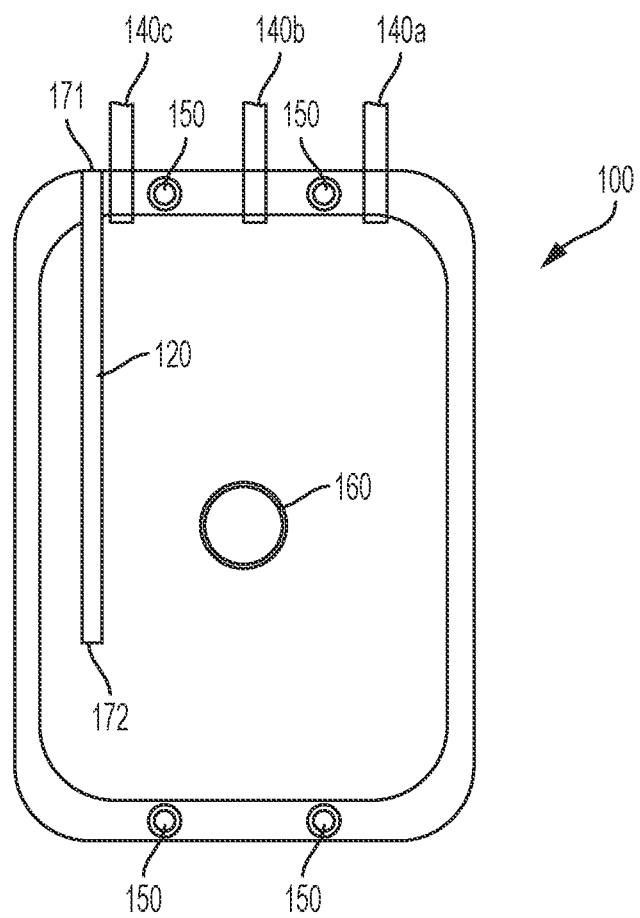
FIG. 2A
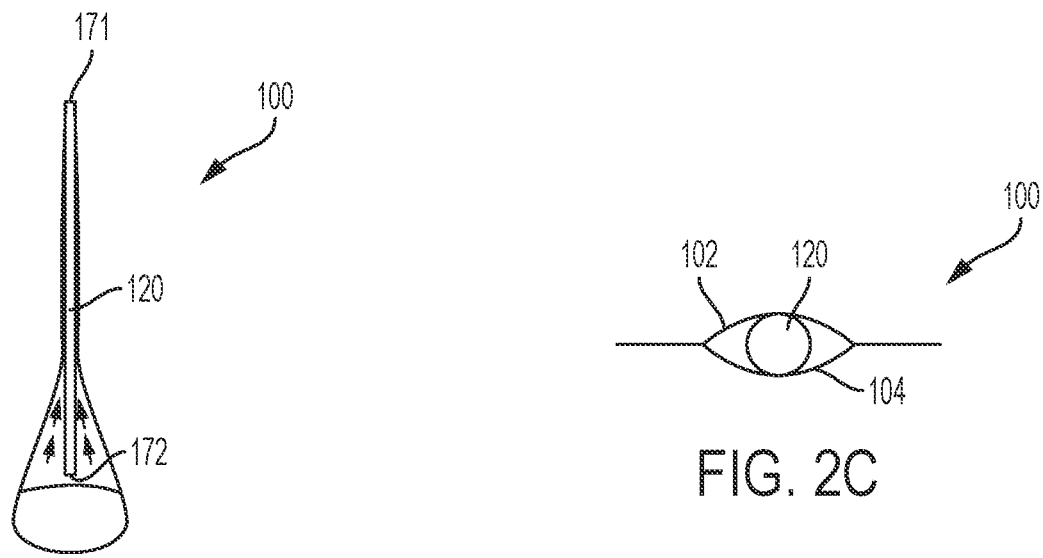
FIG. 2B
FIG. 2C

ASEPTIC BIOPROCESS PACKAGE

CROSS-REFERENCE FOR RELATED APPLICATIONS

This is a divisional application of U.S. patent application Ser. No. 16/497,518, filed on Mar. 16, 2018, which is a national stage application under 35 U.S.C. § 371 of International Application No. PCT/US2018/022768, filed on Mar. 16, 2018, which claims the benefit of priority of U.S. Provisional Application Ser. No. 62/477,647 filed on Mar. 28, 2017 and U.S. Provisional Application Ser. No. 62/640,097 filed Mar. 8, 2018 the contents of which are relied upon and incorporated herein by reference in their entirety as if fully set forth below.

FIELD

The present disclosure generally relates to bioprocess bags for cell culture and systems employing the same. In particular, the present disclosure relates to bioprocess bags having a channel-forming feature that facilitates removal of fluid and/or other components from the interior compartment of the bioprocess bag.

BACKGROUND

Bags containing fluids under sterile conditions are used in the bioprocessing industry for the formulation, storage, transfer and transport of fluid while maintaining sterile conditions. Some of the characteristics of the bags to preserve the quality of the products contained within include biocompatibility with the products, sterility, and non-pyrogenicity. The bags are typically disposed of after use and are recognized as efficient means to prepare and store sterile fluids. Generally, these disposable bioprocessing bags are flexible and made from compatible plastic that is sterilized by Gamma radiation. The bags can be used for all bioprocessing applications including, but not limited to, formulating, filing, storing and transporting final product, stocking pharmaceuticals in cold storage or deep freeze and for sampling and analytical purposes. The bags may also provide an environment for cell culture. Additionally, the bags may be used for biological fluids such as serum, buffers, and ultrapure water and also for growing cell cultures to obtain the valuable biopharmaceutical compounds produced by cells.

For cell culture it is conventional to grow cells on a cell adhering surface since most mammalian cells and certain other cells are anchorage-dependent to be able to grow. In contrast to cell culture on flat surfaces where adherent cells can reach high confluence and thus limit cell expansion via cell-to-cell contact inhibition, spherically-shaped microcarriers having a high ratio of surface area/volume present an attractive platform for efficient cell culture scale-up or expansion where either harvested cells, cell-based products, or conditioned media can be the desired product. While microcarriers formed from plastic materials have previously been used for cell culture, dissolvable microcarriers, or microcarriers which are enzymatically digested to separate cells from the surface of the microcarrier, are providing certain advantages in cell culture applications.

Cell culture materials, including microcarriers, are preferably sterile. However, the emphasis on sterility in the bioprocessing industry has given rise to a demand for the ability to aseptically transfer pre-sterilized microcarriers into a bioreactor without compromising sterility and to perform most phases of cell growth in a closed system. As used herein, the term "closed system" refers to a system sealed to ensure sterility of the contents of the system and to limit or prevent the introduction of contaminants from the surrounding atmosphere. Conventionally, microcarriers are sterilized through autoclaving prior to adding the microcarriers to a bioreactor. Gamma sterilization, due to its process efficiency and depth of penetration, may also be a useful method for disinfecting dissolvable microcarriers. However, the presence of water or humidity during gamma sterilization creates undesired free radicals, which can damage cells. It is thus contemplated that dissolvable microcarriers be dried prior to sterilization and then rehydrated after sterilization. Thus, there is also a demand for the ability to rehydrate and wash dissolvable microcarriers and to aseptically transfer the rehydrated dissolvable microcarriers into a bioreactor without compromising sterility.

SUMMARY

According to an embodiment of the present disclosure, an aseptic bioprocess package is provided. The aseptic bioprocess package includes a 2D flexible container having an interior compartment, a height having an upper half and a lower half, an inlet and an outlet, the inlet and the outlet being disposed on the same half of the 2D flexible container and a channel-forming feature in the interior compartment of the container, the channel-forming feature being configured to maintain a fluid flow path that fluidly connects the interior compartment of the flexible container with the outlet.

According to an embodiment of the present disclosure, a method for processing dry microcarrier material in an aseptic bioprocess package is provided. The method includes filling a bioprocess package with dry microcarrier material. The bioprocess package includes a 2D flexible container having an interior compartment, a height having an upper half and a lower half, an inlet and an outlet, the inlet and the outlet being disposed on the same half of the 2D flexible container, and a channel-forming feature in the interior compartment of the container, the channel-forming feature being configured to maintain a fluid flow path that fluidly connects the interior compartment of the flexible container with the outlet. The method further includes sterilizing the dry microcarrier material in the bioprocess package, hydrating the dry microcarrier material in the bioprocess package to form a hydrated microcarrier material, washing the hydrated microcarrier material in the bioprocess package, and aseptically transferring the hydrated microcarrier material from the bioprocess package to a cell culture vessel.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which:

FIG. 2A is a schematic illustration of a bioprocess bag having a channel-forming feature in accordance with embodiments of the present disclosure;

FIG. 2B is a schematic illustration showing a side view of the bioprocess bag having a channel-forming feature of FIG. 2A;

FIG. 2C is a schematic illustration showing an enlarged and exaggerated top view of the bioprocess bag having a channel-forming feature of FIG. 2B;

DETAILED DESCRIPTION

Figure 1:
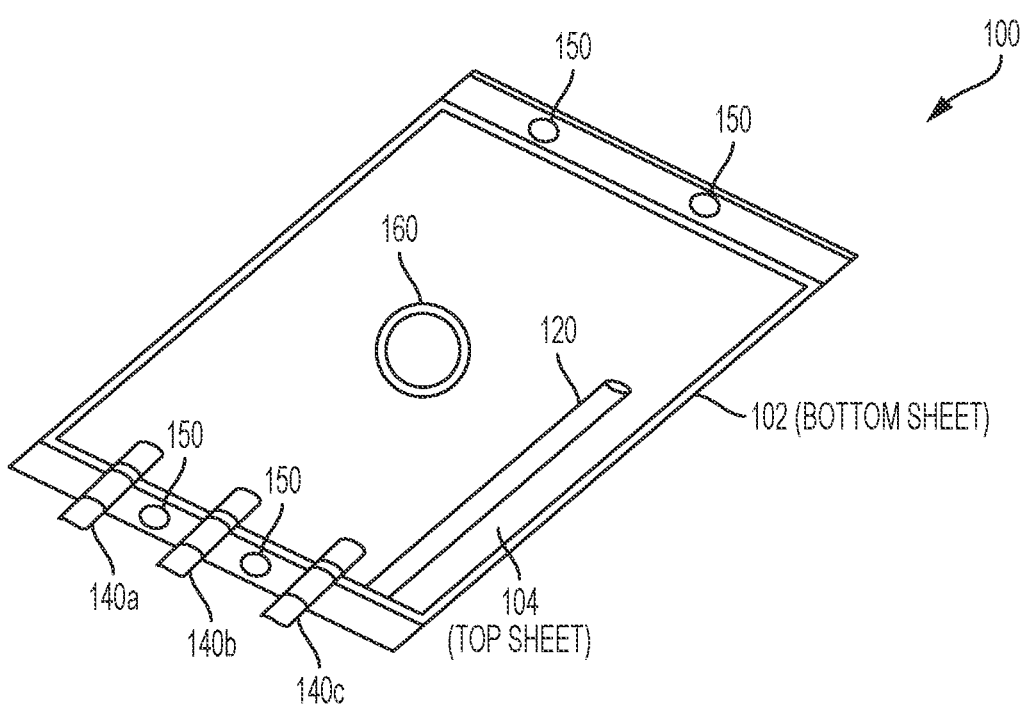
FIG. 1 illustrates an exemplary bioprocess bag having a channel-forming feature in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, "have," "having," "include," "including," "comprise," "comprising" or the like are used in their open ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure relate to bioprocess bags. The bioprocess bags described herein are 2D bags formed from flexible materials. As used herein, the term "2D bag" refers to a flat, rectangular, "pillow-style" bag formed by seaming together two flexible sheets. Bioprocess bags in accordance with embodiments of the present disclosure are formed from disposable materials and may be discarded after a single use, thereby eliminating washing/sterilizing operations as well as maintenance associated with conventional cell culture vessels. The bioprocess bags described herein advantageously allow for one or more of sterilizing microcarrier material, transporting the sterilized microcarrier material, hydrating the sterilized microcarrier material, washing the sterilized microcarrier material and aseptically transferring the microcarrier material from the bag to a cell culture vessel, such as, for example, a bioreactor. With the bioprocess bags described herein, such actions can be taken without exposing the microcarrier material to the surrounding atmosphere.

FIG. 1 illustrates a bioprocess bag in accordance with embodiments of the present disclosure. As shown, the bioprocess bag 100, 1100 includes at least two sheets 102, 104 formed from films or laminates. The sheets 102, 104 are hermetically sealed (for example by welding or by an adhesive) along the edges of the sheets to form a pillow-shaped bag having an interior compartment for receiving fluid. The bioprocess bag 100, 1100 preferably provides a closed system for use in all phases of processing fluid and/or other components. FIG. 1 illustrates an exemplary configuration of a bioprocess bag formed from two sheets 102, 104 that are longer than they are wide and, when attached along their edges, form a bioprocess bag 100, 1100 having two sides, a top and a bottom where the two sides are longer than the top and the bottom are wide. It should be understood that this is just an exemplary configuration, and that the bioprocess bag as described herein may have a top, a bottom and two sides having equal lengths. The bioprocess bag 100, 1100 is described herein as having two sides, a top and a bottom. However, it should be understood that the terms "top", "bottom", "side" and the like are used herein for descriptive purposes and not necessarily for describing permanent relative positions. It should be understood that the terms so used are interchangeable under appropriate circumstances such that embodiments of the present disclosure are, for example, capable of operation in other orientations than those illustrated or otherwise described herein.

As used herein, the term "fluid" refers to any substance capable of flowing, such as liquids, liquid suspensions, gases, gaseous suspensions, or the like, without limitation. The term "fluid and/or other components" is used throughout the present disclosure to refer to fluid which may include cell culture media having nutrients for cell growth, cells, byproducts of the cell culture process, and any other biological materials or components that may conventionally be added or formed in a bioprocess system. Bioprocess bags and other vessels described herein may include one or more cells or reagents. The bags may also include buffers. Additionally, the bags may include cell culture media. Cell culture media may be for example, but is not limited to, sugars, salts, amino acids, serum (e.g., fetal bovine serum), antibiotics, growth factors, differentiation factors, colorant, or other desired factors. Common culture media that may be provided in the bag includes Dulbecco's Modified Eagle Medium (DMEM), Ham's F12 Nutrient Mixture, Minimum Essential Media (MEM), RPMI Medium, and the like. Any type of cultured cell may be included in the bag including, but not limited to, immortalized cells, primary culture cells, cancer cells, stem cells (e.g., embryonic or induced pluripotent), etc. The cells may be mammalian cells, avian cells, piscine cells, etc. The cells may be of any tissue type including, but not limited to, kidney, fibroblast, breast, skin, brain, ovary, lung, bone, nerve, muscle, cardiac, colorectal, pancreas, immune (e.g., B cell), blood, etc. The cells may be in any cultured form in the bag including disperse (e.g., freshly seeded), confluent, 2-dimensional, 3-dimensional, spheroid, etc. In some embodiments, cells are present without media (e.g., freeze-dried, in preservative, frozen, etc.). As will be described in further detail below, bioprocess bags and other vessels described herein may also include microcarrier material.

Each of the sheets 102, 104 of the bioprocess bag 100, 1100 may be formed from one or more of the same or different materials. Such materials are those conventionally associated with disposable products for bioprocess applications. Any or all of the sheets 102, 104 of the bioprocess bag 100, 1100 may be formed from a film or laminate that includes at least one plastic material from the following group: polyethylene (PE), polypropylene (PP), polyvinyl chloride (PVC), polyethylene terephtalate (PET), polystyrene (PS), polycarbonate (PC), polymethylpentene (PMP), polyetheretherketone (PEEK) polytetrafluoroethylene (PTFE), polyfluoroalkoxy (PFA), polychlorotrifluoroethylene (PCTFE), ethylene vinyl acetate (EVA), and derivatives thereof.

It should be understood that the dimensions of the bioprocess bag 100, 1100 including both relative and absolute dimensions can be varied. For example, the bags may be configured to hold a volume of fluid and/or other components of about 1.0 mL, or about 5.0 mL, or about 10 mL, or about 25 mL, or about 50 mL, or about 100 mL, or about or about 250 mL, or about 500 mL, or about 1.0 L, or 5.0 L, or about 10 L, or about 50 L, or about 100 L, or about 150 L or even about 200 L, as well as all volumes therein between.

Total thickness of the film or laminate may be selected, for example, based on the desired gas permeability of the bioprocess bag 100, 1100 or based on the desired rigidity or flexibility of the bag 100, 1100. For example, the thickness of sheets 102, 104 may be between about 0.002 inches and about 1.5 inches. As described herein, the thickness of sheet 102 and sheet 104 may be the same or different.

The bioprocess bag 100, 1100 is hermetically sealed and may have one or more openings for introducing or recovering fluid and/or other components. Where the bioprocess bag 100, 1100 includes one or more openings, the one or more openings may include seals that in a first configuration expose the one or more openings to aseptic fluid communication between an external container and the interior compartment of the bag through the opening. In a second configuration, the seals close the one or more openings and prevent or reduce fluid communication between the outside of the bag and the interior compartment of the bag through the opening. The seals may take any desired form, including, but not limited to, a clamp, tape, a cap, a tube portion having a welded end, a zipper, a slide zipper, interlocking or coupling structures, aseptic connectors and the like.

Bioprocess bags 100, 1100 as described herein include at least one connection apparatus which includes an internal fluid passage that permits the flow of fluids and/or other components into or out of the interior compartment of the bioprocess bag 100, 1100. With further reference to FIG. 1, the at least one connection apparatus may be at least one connector 140 which includes an internal fluid passage that permits the flow of fluids and/or other components into or out of the interior compartment of the bioprocess bag 100. The at least one connector 140 includes a proximal end and a distal end and extends through an opening formed in a portion of the sealed edge of the bioprocess bag 100. The proximal end of the at least one connector 140 may extend through the opening and into the interior compartment of the bioprocess bag 100. Alternatively, without extending into the interior compartment of the bioprocess bag 100, the proximal end of the at least one connector 140 may be positioned in the opening such that flow of fluids and/or other components into or out of the interior compartment of the bioprocess bag 100 is permitted. At least a portion of the film or laminate of the sheets 102, 104 is heat sealed, or otherwise adhered, around the at least one connector 140 such that the bioprocess bag 100 is hermetically sealed.

Figure 11A:
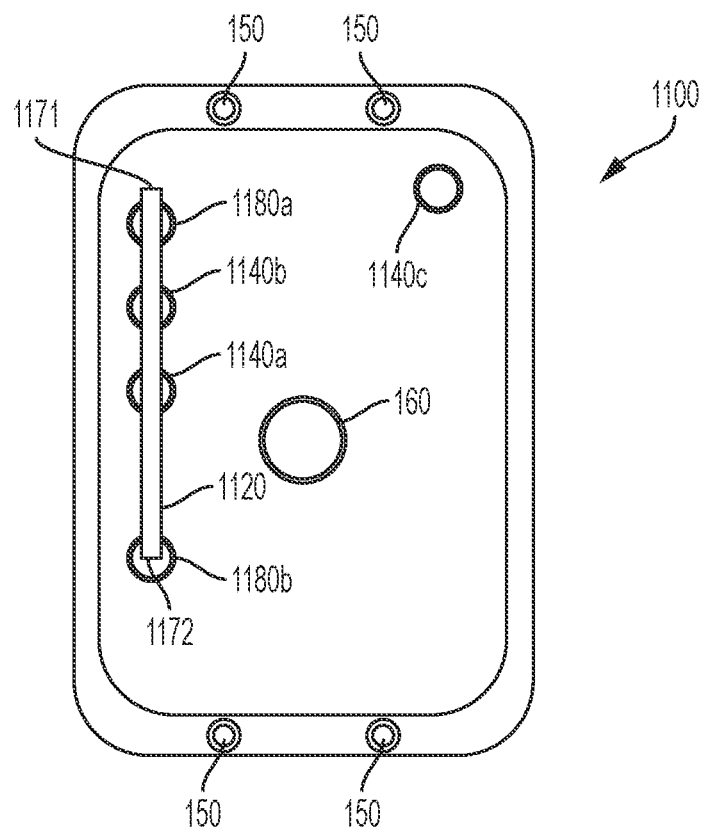
FIG. 11A is a schematic illustration of a bioprocess bag having a channel-forming feature in accordance with embodiments of the present disclosure.
Figure 11B:
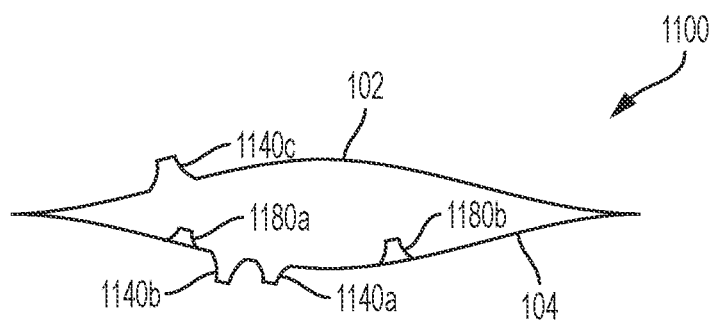
FIG. 11B is a schematic illustration showing a side view of a bioprocess bag having a channel-forming feature of FIG. 11A.
Figure 12:
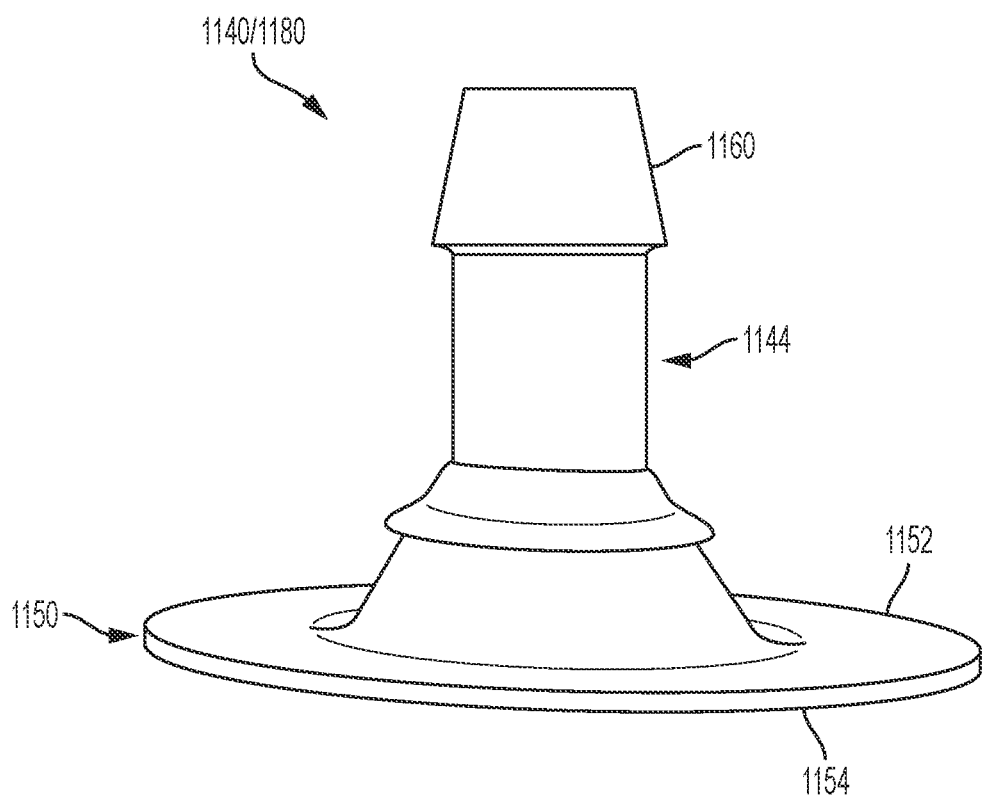
FIG. 12 illustrates an exemplary face port in accordance with embodiments of the present disclosure.

With reference to FIGS. 11A and 11B, the at least one connection apparatus may be at least one outwardly facing face port 1140 which includes an internal fluid passage that permits the flow of fluids and/or other components into or out of the interior compartment of the bioprocess bag 1100. The outwardly facing face port 1140 may be formed in a face of at least one of sheets 102, 104. As shown in FIG. 12, the at least one face port 1140 may include a base flange 1150 having a top surface 1152 and a bottom surface 1154. At least a portion of the film or laminate of one of sheet 102 and sheet 104 is welded, heat sealed, or otherwise adhered to the base flange 1150 of at least one face port 1140 such that the bioprocess bag 1100 is hermetically sealed. The at least one face port 1140 further includes an extension 1144 that extends a predetermined length from the base flange 1150 and is configured to engage an open end of a length of tubing. The extension 1144 may include a coupler, such as a barb 1160, at one end to facilitate engagement with an open end of tubing. According to embodiments of the present disclosure, the at least one face port 1140 is configured such that the extension 1144 extends to an external side of the bioprocess bag 1100 and not into the interior compartment of the bioprocess bag 1100. One of sheet 102 and sheet 104 may be welded, heat sealed, or otherwise adhered to the top surface 1152 of the base flange 1150. Alternatively, one of sheet 102 and sheet 104 may be welded, heat sealed, or otherwise adhered to the bottom surface 1154 of the base flange 1150. As used herein, the term "face port" refers to a port that is located on the face of at least one of sheet 102 and sheet 104 rather than on an edge or seam of the bioprocess bag 100, 1100. Also as used herein, the term "outwardly facing face port" refers to a face port having an extension which extends from a sheet to an external side of the bioprocess bag and not into the interior compartment of the bioprocess bag. In contrast, as used herein, the term "inwardly facing face port" refers to a face port having an extension which extends from a sheet to into the interior compartment of the bioprocess bag.

The at least one connector 140 or the at least one face port 1140 may be a relatively rigid plastic component formed from, for example, but not limited to, high density polypropylene (HDPP), polypropylene, high density polyethylene (HDPE), polyethylene, EVA, LDPE and LLDPE. Optionally, the at least one connector 140 may be flexible plastic tubing. Where the at least one connector 140 is a relatively rigid plastic component, the distal end of the at least one connector 140 is configured to engage an open end of a length of tubing which aseptically fluidly connects the at least one connector 140 to a separate length of tubing (i.e., through an aseptic connector) or to a connection apparatus of an external container. Similarly, where the at least one face port 1140 is a relatively rigid plastic component, the extension 1144 is configured to engage an open end of a length of tubing which aseptically fluidly connects the at least one face port 1140 to a separate length of tubing (i.e., through an aseptic connector) or to a connection apparatus of an external container. Where the at least one connector 140 is flexible plastic tubing, the at least one connector 140 may be aseptically fluidly connected to a separate length of tubing (i.e., through an aseptic connector) or to a connection apparatus of an external container. The seals described above may interact with, or be connected to, the at least one connector 140, the extension 1144 and/or the separate length of tubing to selectively permit or prevent fluid communication between the interior compartment of the bag 100, 1100 and an external container.

The bioprocess bag 100 may include a plurality of connectors 140, such as connectors 140a, 140b and 140c shown, for example, in FIG. 1. The dimensions of the plurality of connectors 140 may be equal, or the dimensions of each of the plurality of connectors 140 may vary. It is also contemplated that the dimensions of at least two of the plurality of connectors 140 may be equal and at least one other of the plurality of connectors 140 differs from the dimensions of the at least two of the plurality of connectors 140. Where the at least one connector 140 is a relatively rigid plastic connector, the at least one connector 140 may include a coupler configured to hold the at least one connector 140 in the bioprocess bag 100. The coupler may be a portion having any shape that extends from an outer wall of the at least one connector 140 around which portions of the film or laminate of sheets 102, 104 may be heat sealed. The coupler may be, for example, a barb, a plastic ring, or a plastic flange. The coupler may be integrally formed with the at least one connector 140 or may be separately formed and attached to the at least one connector 140. Where the bioprocess bag 100 includes a plurality of connectors 140a, 140b, 140c with a first of the connectors 140 being an inlet and a second of the connectors 140 being an outlet, the inlet and the outlet are arranged on the same side of the bioprocess bag 100 (i.e., at the top of the bag). Optionally, a bioprocess bag 100 having more than two connectors 140 may include any number of connectors 140 arranged on any side of the bioprocess bag 100 so long as two of the connectors 140 are located on the same side of the bag with a first of the two connectors 140 being an inlet and a second of the two connectors 140 being an outlet. Referring once again to FIG. 1 as an example, connector 140a may be an inlet and connector 140c may be an outlet.

The bioprocess bag 1100 may include a plurality of face ports 1140, such as face ports 1140a, 1140b and 1140c shown, for example, in FIGS. 11A and 11B. The dimensions of the plurality of face ports 1140 may be equal, or the dimensions of each of the plurality of face ports 1140 may vary. It is also contemplated that the dimensions of at least two of the plurality of face ports 1140 may be equal and at least one other of the plurality of face ports 1140 differs from the dimensions of the at least two of the plurality of face ports 1140. Where the bioprocess bag 1100 includes a plurality of face ports 1140a, 1140b, 1140c with a first of the face ports 1140 being an inlet and a second of the face ports 1140 being an outlet, the inlet and the outlet are arranged on the same half of the height of the bioprocess bag 1100 (i.e., an upper half of a sheet 102, 103 of the bag). Optionally, a bioprocess bag 1100 having more than two face ports 1140 may include any number of face ports 1140 arranged on any side of the bioprocess bag 1100 so long as two of the face ports 1140 are located on the same side of the bag with a first of the two face ports 1140 being an inlet and a second of the two face ports 1140 being an outlet. Referring once again to FIGS. 11A and 11B as an example, face port 1140a may be an inlet and face port 1140b may be an outlet.

Figure 5:
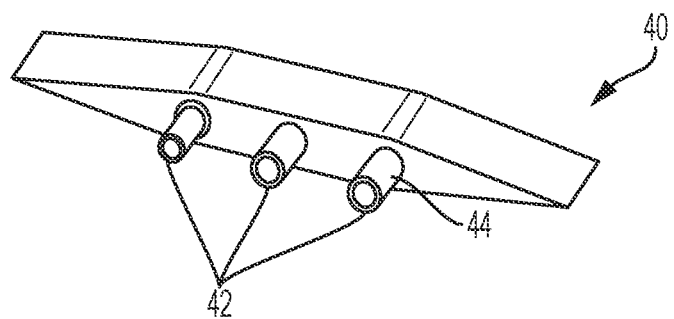
FIG. 5 illustrates an exemplary port fitment in accordance with embodiments of the present disclosure.
Figure 6:
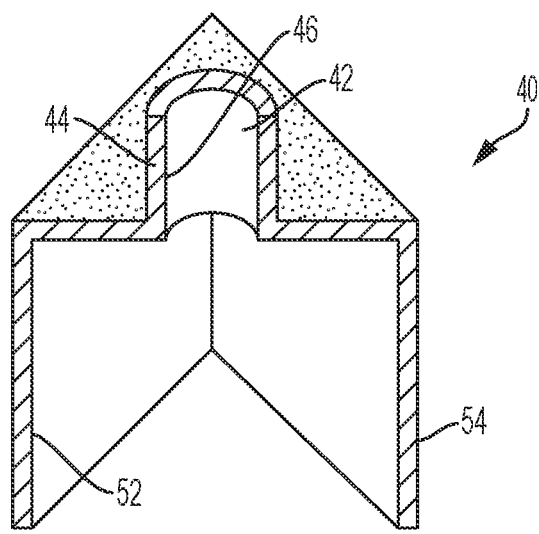
FIG. 6 illustrates a cross section of an exemplary port fitment in accordance with embodiments of the present disclosure.

According to embodiments of the present disclosure, the at least one connection apparatus may be a port fitment 40, such as the port fitment 40 shown in FIG. 5, having at least one port 42 that permits the flow of fluids and/or other components into or out of an interior compartment of the bioprocess bag 100. As shown in FIG. 6, the at least one port 42 is in fluid communication with an interior passage of an extension 44 that extends a predetermined length from an opening of the at least one port 42 and is configured to engage an open end of a length of tubing. The extension 44 may include a coupler, such as a barb, at one end to facilitate engagement with an open end of tubing. The port fitment 40 may include a plurality of ports 42. The dimensions of the plurality of ports 42 may be equal for each of the plurality of ports 42, or the dimensions of each of the plurality of ports 42 may vary. It is also contemplated that the dimensions of at least two of the plurality of ports 42 may be equal and at least one other of the plurality of ports 42 differs from the dimensions of the at least two of the plurality of ports 42. According to embodiments of the present disclosure, the port fitment 40 may be any shape. The exemplary port fitment 40 illustrated in the figures is a boat shaped port fitment, but the port fitment 42 disclosed herein is not so limited. The port fitment 40 may be a plastic port fitment formed from, for example, but not limited to, high density polypropylene (HDPP), polypropylene, high density polyethylene (HDPE), polyethylene, EVA, LDPE and LLDPE.

Connection is formed between a polymer layer of the film or laminate of the sheets 102, 104 and the port fitment 40 to form a hermetic seal between the bag 100 and the port fitment 40. As shown in FIG. 6, the port fitment 40 includes an exterior surface 54 and an interior surface 52. Connection between the bioprocess bag 100 and the port fitment 40 may be along any one of the exterior surface 54 and the interior surface 52. The connection may be made by welding or any other type of attachment, such that, with the exception of the at least one port 42, a fluid-impervious seal is formed between the port fitment 40 and the bioprocess bag 100.

According to embodiments of the present disclosure, the bioprocess bag 100, 1100 includes a channel-forming feature. A problem encountered when dispensing the contents of flexible bags is that portions of the sheets of the bags can collapse into contact with each other to form sealed pockets as the volume of the bag shrinks. The channel-forming feature described herein prevents the sheets 102, 104 of the bioprocess bag 100, 1100 from sealing off portions of the bag 100, 1100 and/or from isolating the fluid and/or other components in the bag 100, 1100 from reaching an outlet. The channel-forming feature prevents the bag 100, 1100 from closing on itself, thus providing a fluid flow path for the contents of the bag 100, 1100 to reach an outlet.

As shown in FIGS. 2A-2C, the channel-forming feature as described herein may be a solid extruded plastic component 120 that extends from a first end 171 to a second end, 172 the second end 172 being disposed in the interior compartment of the bioprocess bag 100. The first end 171 of the solid extruded plastic component 120 may be welded into a seam of the bioprocess bag 100, for example, into the top seam of the bioprocess bag 100. Alternatively, the first end 171 of the solid extruded plastic component 120 may be disposed in one of the plurality of connectors 140. Similarly, where the at least one connection apparatus is a port fitment 40 as described herein, the first end 171 of the solid extruded plastic component 120 may be disposed within one of the plurality of ports 42. The solid extruded plastic component 120 extends into the interior compartment of the bioprocess bag 100 a distance sufficient to prevent the sheets 102, 104 of the bioprocess bag 100 from sealing off portions of the bag 100 and/or from isolating the fluid and/or other components in the bag 100 from reaching an outlet. According to embodiments of the present disclosure, the solid extruded plastic component 120 may have a length such that it spans at least about half the distance between the top of the bioprocess bag 100 and the bottom of the bioprocess bag 100. In other words, the solid extruded plastic component 120 may have a length that is at least about half the length of the sheets 102, 104 of the bioprocess bag 100, but preferably less than the full length of the sheets 102, 104 of the bioprocess bag 100. For example, where the length of the sheets 102, 104 is represented by "L", the solid extruded plastic component 120 may have a length that is between about 0.5 L and about 0.95 L, or between about 0.5 L and about 0.85 L, or even between about 0.5 L and about 0.75 L. The solid extruded plastic component 120 may have any cross-sectional shape such as round, square or rectangular. The solid extruded plastic component 120 may also have a shape that advantageously provides additional channels through which fluid may flow. For example, the solid extruded plastic component 120 may have a star-shaped cross-section.

Figure 3A:
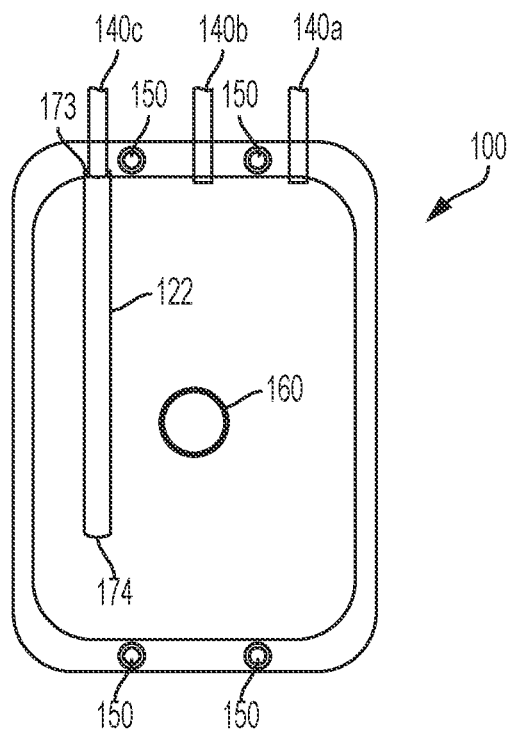
FIG. 3A is a schematic illustration of a bioprocess bag having a channel-forming feature in accordance with embodiments of the present disclosure.
Figure 3B:
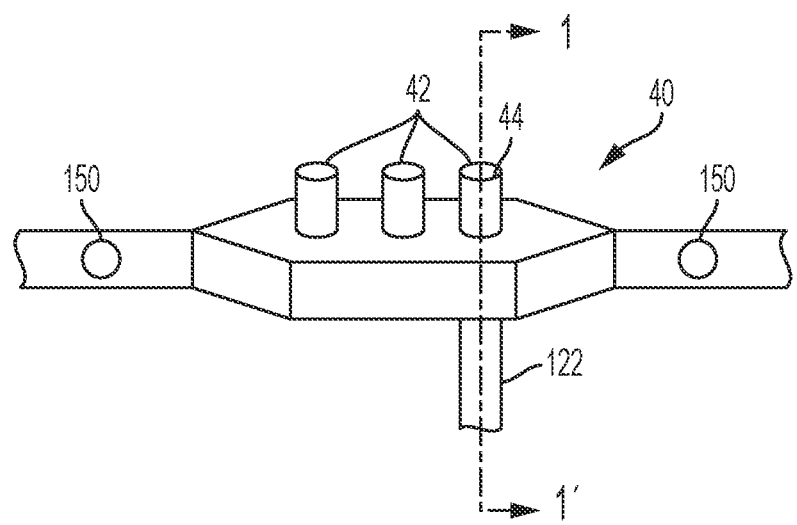
FIG. 3B is a schematic illustration of a port fitment having a channel-forming feature attached thereto in accordance with embodiments of the present disclosure.
Figure 3C:
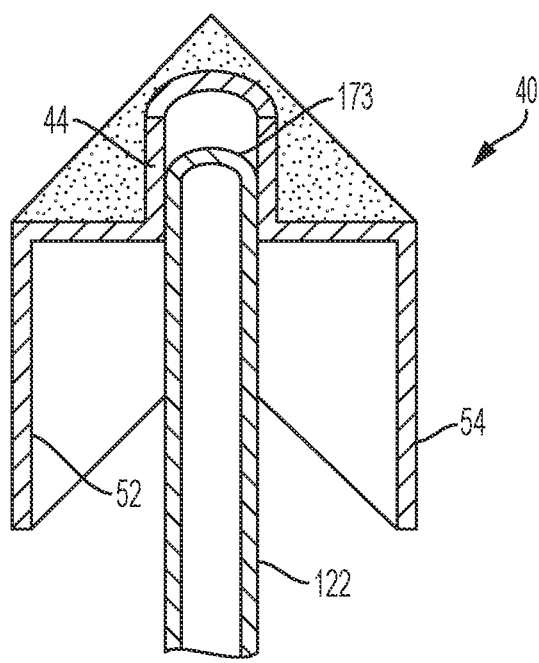
FIG. 3C is a cross sectional view of the port fitment of FIG. 3B sectioned along line 1-1' of FIG. 3B.

As shown in FIGS. 3A-3C, the channel-forming feature as described herein may be a tubular plastic component 122 (such as a portion of tubing) that extends from a first end 173 to a second end 174, the second end 174 being disposed in the interior compartment of the bioprocess bag 100. The first end 173 of the tubular plastic component 122 may be welded into a seam of the bioprocess bag 100, for example, into the top seam of the bioprocess bag 100. Alternatively, as shown in FIG. 3A, the first end 173 of the tubular plastic component 122 may be attached to, or disposed in, one of the plurality of connectors 140. Similarly, as shown in FIGS. 3B and 3C, where the at least one connection apparatus is a port fitment 40 as described herein, the first end 173 of the tubular plastic component may be attached to, or disposed within, one of the plurality of ports 42. Such arrangement also allows the channel-forming feature to form a conduit which cannot be closed off by exertion of a pressure on sheets 102, 104 as the bioprocess bag 100 collapses. The second end 174 of the tubular plastic component 122 may be a closed end, or may include a plug inserted in the end of the tubular plastic component 122 to isolate the interior of the tubular plastic component 122 from the contents of the interior compartment of the bioprocess bag 100. The tubular plastic component 122 extends into the interior compartment of the bioprocess bag 100 a distance sufficient to prevent the sheets 102, 104 of the bioprocess bag 100 from sealing off portions of the bag 100 and/or from isolating the fluid and/or other components in the bag 100 from reaching an outlet. According to embodiments of the present disclosure, the tubular plastic component 122 may have a length such that it spans at least about half the distance between the top of the bioprocess bag 100 and the bottom of the bioprocess bag 100. In other words, the tubular plastic component 122 may have a length that is at least about half the length of the sheets 102, 104 of the bioprocess bag 100, but preferably less than the full length of the sheets 102, 104 of the bioprocess bag 100. For example, where the length of the sheets 102, 104 is represented by "L", the tubular plastic component 122 may have a length that is between about 0.5 L and about 0.95 L, or between about 0.5 L and about 0.85 L, or even between about 0.5 L and about 0.75 L.

Figure 4A:
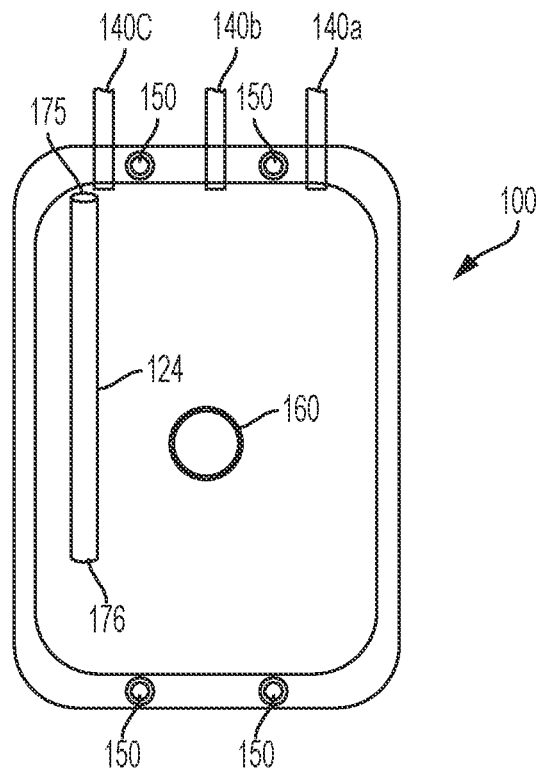
FIG. 4A is a schematic illustration of a bioprocess bag having a channel-forming feature in accordance with embodiments of the present disclosure.
Figure 4B:
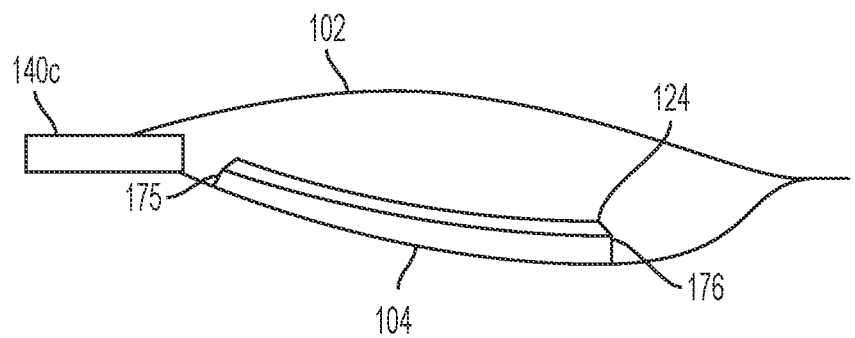
FIG. 4B is a schematic illustration showing a side view of a bioprocess bag having a channel-forming feature of FIG. 4A.

As shown in FIGS. 4A and 4B, the channel-forming feature as described herein may be a raised portion 124 which extends from an interior face of at least one of sheet 102 and sheet 104 into the interior compartment of the bioprocess bag 100. The raised portion 124 may be a textured portion of the interior face of at least one of sheet 102 and sheet 104. As used herein, the term "textured" refers to surface deformations (relative to a planar untextured sheet) as well as multiple surface regions or faces produced by uniaxial or biaxial folding, shaping, or the like that are intentionally imparted to the surface rather than merely the texture that is inherently present on the surface due to the natural topography of the surface, surface contamination, and the like. Alternatively, the raised portion 124 may be a plastic component attached, using an adhesive or via heat sealing, to the interior face of the sheet 102, 104 which is more rigid than the film or laminate of sheets 102, 104. Such plastic component may be formed from, for example, but not limited to, high density polypropylene (HDPP), polypropylene, high density polyethylene (HDPE), polyethylene, EVA, LDPE and LLDPE. While these materials do have some inherent flexibility when used to form relatively thin components or when a moderate amount of bending force is applied thereto, the raised portion 124 is distinguished from the flexible portions of the bioprocess bag 100 in that the raised portion 124 generally maintains its shape when a force is applied to dispense the contents of the bioprocess bag 100.

As shown in FIGS. 4A and 4B, The raised portion 124 may extend along any portion of the interior face of at least one of sheet 102 and sheet 104 a distance sufficient to prevent the sheets 102, 104 of the bioprocess bag 100 from sealing off portions of the bag 100 and/or from isolating the fluid and/or other components in the bag 100 from reaching an outlet. The raised portion 124 shown in FIGS. 4A and 4B extends from a first end 175 to a second end 176 along the interior face of at least one of sheet 102 and sheet 104 from approximately the top of the bioprocess bag 100 and to at least about half the distance between the top of the bioprocess bag 100 and the bottom of the bioprocess bag 100. The raised portion 124 shown in FIGS. 4A and 4B extends from approximately the top of the bioprocess bag 100 along the interior face of at least one of sheet 102 and sheet 104 and is substantially straight. However, the raised portion 124 is not so limited. The raised portion 124 as describe herein may have any shape, or may follow any path extending from approximately the top of the bioprocess bag 100 along the interior face of at least one of sheet 102 and sheet 104. For example, the raised portion 124 may extend in a curved or circuitous path from approximately the top of the bioprocess bag 100. Additionally, while the bioprocess bag 100 shown in FIGS. 4A and 4B includes one raised portion 124, bioprocess bags 100 as described herein may include any number of a plurality of raised portions 124 having any dimensions. Also, as a non-limiting example, the interior face of at least one of sheet 102 and sheet 104 may include a plurality of individual and distinct raised portions 124 of the same or varying dimensions which form a pattern on the interior face of at least one of sheet 102 and sheet 104. Such pattern may generally extend from approximately the top of the bioprocess bag 100.

As shown in FIGS. 11A and 11B, the channel-forming feature as described herein may be a tubular plastic component 1120 (such as a portion of tubing) that extends from a first end 1171 to a second end 1172. The bioprocess bag 1100 may include a plurality of inwardly facing face ports 1180, such as face ports 1180a and 1180b shown, for example, in FIGS. 11A and 11B. FIG. 11B illustrates the bioprocess bag 1100 without the tubular plastic component 1120 to more clearly show the inwardly facing face ports 1180. The inwardly facing face ports 1180 have all of the same features as the outwardly facing face ports 1140 such as illustrated in FIG. 12. In contrast to outwardly facing face ports 1140, inwardly facing face ports 1180 provide an extension 1144 into the interior compartment of the bioprocess bag 1100, but do not permit the flow of fluids and/or other components into or out of the interior compartment of the bioprocess bag 1100. Optionally, one of sheet 102 and sheet 104 may be welded, heat sealed, or otherwise adhered to the bottom surface 1154 of the base flange 1150 such that the internal fluid passage of the face ports 1180 is closed to the external side of the bioprocess bag 1100. FIG. 11A illustrates the bioprocess bag 1100 with the tubular plastic component 1120 and, as shown, the first end 1171 of the tubular plastic component 1120 may be attached to, or disposed in, an extension 1144 of one of the face ports 1180a and the second end 1172 of the tubular plastic component 1120 may be attached to, or disposed in, an extension 1144 of another of the face ports 1180b. Optionally, the first end 1171 of the tubular plastic component 1120 may be welded or sealed to the extension 1144 of one of the face ports 1180 and the second end 1172 of the tubular plastic component 1120 may be welded or sealed to the extension 1144 of another of the face ports 1180.

As shown in FIGS. 11A and 11B, at least two of the outwardly facing face ports 1140 are disposed between the inwardly facing face ports 1180. In FIG. 11A, outwardly facing face ports 1140a, 1140b, are disposed on substantially the same line with the inwardly facing face ports 1180a, 1180b, but it should be appreciated that such a configuration is not required. The outwardly facing face ports 1140a, 1140b may be disposed anywhere along the height of the bioprocess bag 1100 that is between face port 1180a and face port 1180b so long as the channel-forming feature can form a conduit which cannot be closed off by exertion of a pressure on sheets 102, 104 as the bioprocess bag 1100 collapses. The distance between face port 1180a and face port 1180b is sufficient to prevent the sheets 102, 104 of the bioprocess bag 1100 from sealing off portions of the bag 1100 and/or from isolating the fluid and/or other components in the bag 1100 from reaching an outlet. According to embodiments of the present disclosure, the distance between face port 1180a and face port 1180b may be at least about half the height of the bioprocess bag 1100. In other words, the distance between face port 1180a and face port 1180b may be at least about half the length of the sheets 102, 104 of the bioprocess bag 1100, but preferably less than the full length of the sheets 102, 104 of the bioprocess bag 1100. For example, where the length of the sheets 102, 104 is represented by "L", the distance between face port 1180a and face port 1180b may be between about 0.5 L and about 0.95 L, or between about 0.5 L and about 0.85 L, or even between about 0.5 L and about 0.75 L.

Figure 7:
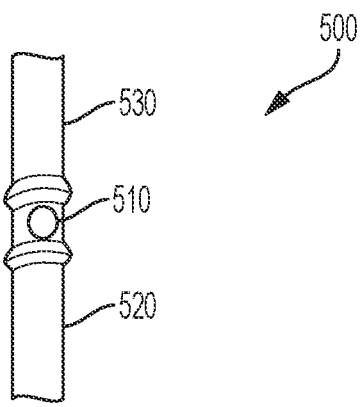
FIG. 7 illustrates an exemplary channel-forming feature extender in accordance with embodiments of the present disclosure.
Figure 8:
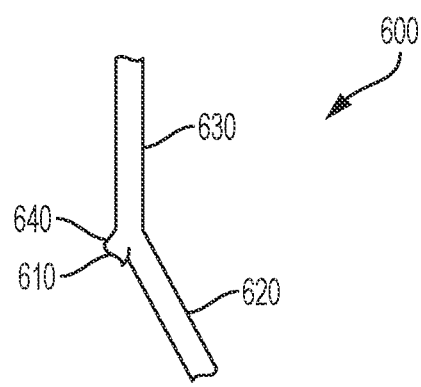
FIG. 8 illustrates an exemplary channel-forming feature extender in accordance with embodiments of the present disclosure.
Figure 9:
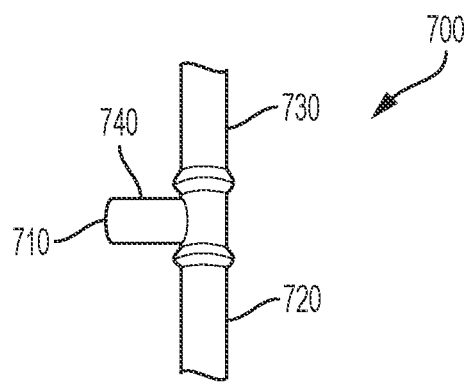
FIG. 9 illustrates an exemplary channel-forming feature extender in accordance with embodiments of the present disclosure.

FIGS. 7-9 illustrate exemplary channel-forming feature extenders which are configured to receive, or be otherwise associated with, a channel-forming feature as described herein. Each of the channel-forming feature extenders shown in FIGS. 7-9 are plastic components which extend from a first end to a second end, the second end being disposed in the interior compartment of the bioprocess bag 100. The first end of extender 500, 600, 700 is configured to be attached to, or disposed in, at least one of the plurality of connectors 140 or attached to, or disposed in, at least one of the plurality of ports 42 of a port fitment 40. Each of extenders 500, 600, 700 includes an opening 510, 610, 710 disposed between the first end and the second end of the channel-forming feature 500, 600, 700. Each of extenders 500, 600, 700 also includes a lower extension 520, 620, 720 which extends between the opening 510, 610, 710 and the second end. As will be described in greater detail below, the lower extension 520, 620, 720 is configured to receive, or be otherwise associated with, a channel-forming feature such as solid extruded plastic component 120 shown in FIGS. 1 and 2A-2C, or tubular plastic component 122 shown in FIGS. 3A-3C. Each of extenders 500, 600, 700 also includes an upper extension 530, 630, 730 which extends between the opening 510, 610, 710 and the first end and which has an interior channel which fluidly connects the opening 510, 610, 710 to the at least one connection apparatus of the bioprocess bag 100. Extenders 600, 700 also include side extensions 640, 740 which include interior channels that fluidly connect the opening 610, 710 and the interior channel of the upper extension 630, 730. Generally, the extenders as described herein further facilitate providing a fluid flow path for the contents of the bioprocess bag 100 to reach an outlet.

The channel-forming feature extender 500 shown in FIG. 7 is a straight component that includes an opening 510 formed in a sidewall. The opening 510 is positioned between the lower extension 520 and the upper extension 530. The upper extension 530 includes an interior channel which fluidly connects the opening 510 to the at least one connection apparatus of the bioprocess bag 100. The lower extension 520 may be a solid portion of the channel-forming feature 500, or may also include an interior channel. A channel-forming feature, such as tubular plastic component 122, may be attached to the lower extension 520. Where the lower extension 520 includes an interior channel, the end of the lower extension 520 remote from the opening 510 may be a closed end, or may include a plug inserted in the end to prevent fluid and/or other components from flowing into the interior channel. Optionally, a channel-forming feature, such as solid extruded plastic component 120 may be disposed in the interior channel of the lower extension 520.

The channel-forming feature extender 600 shown in FIG. 8 is a Y-component where one of the legs of the Y is the lower extension 620 and the other leg of the Y is the side extension 640. The side extension 640 may be shorter in length than the lower extension 620 and includes opening 610 formed in the end of side extension 640. The upper extension 630 includes an interior channel which fluidly connects the opening 610 via the interior channel of the side extension 640 to the at least one connection apparatus of the bioprocess bag 100. The lower extension 620 may be a solid portion of the channel-forming feature 600, or may also include an interior channel. A channel-forming feature, such as tubular plastic component 122, may be attached to the lower extension 620. Where the lower extension 620 includes an interior channel, the end of the lower extension 620 remote from the intersection of extensions 620, 630, 640 may be a closed end, or may include a plug inserted in the end to prevent fluid and/or other components from flowing into the interior channel. Optionally, a channel-forming feature, such as solid extruded plastic component 120 may be disposed in the interior channel of the lower extension 620.

The channel-forming feature extender 700 shown in FIG. 9 is a Tee-component having a side extension 740 extending at a 90 degree angle from the lower extension 720 and the upper extension 730 which together form a straight portion of the feature 700. The side extension 740 includes opening 710 formed in the end of side extension 740. The upper extension 730 includes an interior channel which fluidly connects the opening 710 via the interior channel of the side extension 740 to the at least one connection apparatus of the bioprocess bag 100. The lower extension 720 may be a solid portion of the channel-forming feature 700, or may also include an interior channel. A channel-forming feature, such as tubular plastic component 122, may be attached to the lower extension 720. Where the lower extension 720 includes an interior channel, the end of the lower extension 720 remote from the intersection of the various extensions may be a closed end, or may include a plug inserted in the end to prevent fluid and/or other components from flowing into the interior channel. Optionally, a channel-forming feature, such as solid extruded plastic component 120 may be disposed in the interior channel of the lower extension 720.

According to embodiments of the present disclosure, the channel-forming feature is arranged in the bioprocess bag 100, 1100 to allow for the fluid flow path provided by the channel-forming feature to be in fluid communication with the outlet. Referring again to FIG. 2A as one example, the connector 140c nearest the channel-forming feature, in this case a solid extruded plastic component 120, is preferably an outlet and any of the other of the plurality of the connectors 140a, 140b may be an inlet. Where two or more of the plurality of the connectors 140 are located a similar distance from the channel-forming feature, any of the plurality of the connectors 140 which the channel-forming feature can be maintain in fluid connection with the interior compartment of bioprocess bag 100 may be an outlet. As will be understood from the discussion herein, it should be appreciated that a similar arrangement applies when the channel-forming feature is any of solid extruded plastic component 120, a tubular plastic component 122, a raised portion 124, or any other feature that prevents the bioprocess bag 100 from closing on itself, thus providing a fluid flow path for the contents of the bag 100 to reach the outlet. As exemplified in FIG. 2B, as the bioprocess bag 100 collapses, the channel-forming feature forms a conduit which cannot be closed off by exertion of a pressure on sheets 102, 104 of the bioprocess bag 100. Thus, the entire interior compartment of the bioprocess bag 100 remains in fluid communication with the outlet at all times. Similarly, with reference to FIGS. 3A and 3B, where the at least one connection apparatus is a port fitment 40 as described herein, at least one of a plurality of ports 42 includes the channel-forming feature attached to, or disposed within, the port 42. Such arrangement also allows the channel-forming feature to form a conduit which cannot be closed off by exertion of a pressure on sheets 102, 104 as the bioprocess bag 100 collapses. FIG. 2C is a schematic illustration showing a top view of the bioprocess bag having a channel-forming feature such as is shown in FIGS. 2A and 2B. FIG. 2C illustrates that the channel-forming feature, in this illustration the extruded plastic component 120, prevents sheets 102, 104 from collapsing to a point where the entire face of one sheet 102 is contacted by the other sheet 104 which prevents the sheets 102, 104 from sealing off portions of the bag 100 and/or from isolating the fluid and/or other components in the bag 100 from reaching an outlet. As is clearly shown in FIG. 2C, a fluid flow path around the outside of the channel-forming feature is always maintained.

The bioprocess bag 100, 1100 also includes at least one hole 150 punched in the top welded edge of the bioprocess bag 100, 1100 and at least one hole 150 punched in the bottom welded edge of the bioprocess bag 100, 1100. The holes 150 allow for the bioprocess bag 100, 1100 to be mounted in a hanging position from either the top or the bottom of the bag 100, 1100 as will be described further below. Optionally, the bioprocess bag 100, 1100 may include at least one rigid rod (not shown) sealed within the top welded edge of the bioprocess bag 100, 1100 and at least one rigid rod (not shown) sealed within the bottom welded edge of the bioprocess bag 100, 1100. Similar to the holes 150, the rigid rods allow for the bioprocess bag 100, 1100 to be mounted in a hanging position from either the top or the bottom of the bag 100, 1100.

According to embodiments of the present disclosure, the bioprocess bag 100 may include dry microcarrier material in the interior compartment of the bag 100. As used herein, the term "dry microcarrier material" refers to microcarrier material having a water content of at most 10 wt. % (e.g., at most 1, 2, 4, 5 or 10 wt. % including ranges between any of the foregoing values). The dry microcarrier material may be digestible material such as, but not limited to: pectic acid; pectinic acid; polysaccharides such as dextran, substituted cellulose derivatives, alginic acid, starches, glycogen, arabinoxylans, agarose; glycosaminoglycans such as hyaluronic acid and chondroitin sulfate; various proteins such as elastin, fibrin, silk fibroin, collagen and their derivatives can be also used. Hydrated microcarrier material formed by adding a hydrating fluid to the dry microcarrier material, may be sphere-shaped and may have diameters of about 125 microns to about 300 microns. A hydrating fluid may be for example, but is not limited to, deionized water, a buffer solution, a polyethylene glycol containing solution, and a dilute media. The microcarriers may be coated with proteins, peptides, or charged molecules.

According to embodiments of the present disclosure, the bioprocess bag 100, 1100 may also include a sealable opening 160 which can be used to fill the bag 100, 1100 with dry microcarrier material. As shown, for example in FIG. 2A, the sealable opening 160 may be formed in a face of at least one of sheets 102, 104. The sealable opening 160 may be in the form of a port having a collar which can be sealed and unsealed by a sealing cap. The sealable opening 160 may be fabricated using sealing techniques which are known to persons skilled in the art. The sealing cap may be a threaded screw cap having internal threads that engage external threads of the collar to twist the cap into the collar. A gasket may also be provided in order to provide a fluid-tight seal between the collar and the cap.

Figure 10:
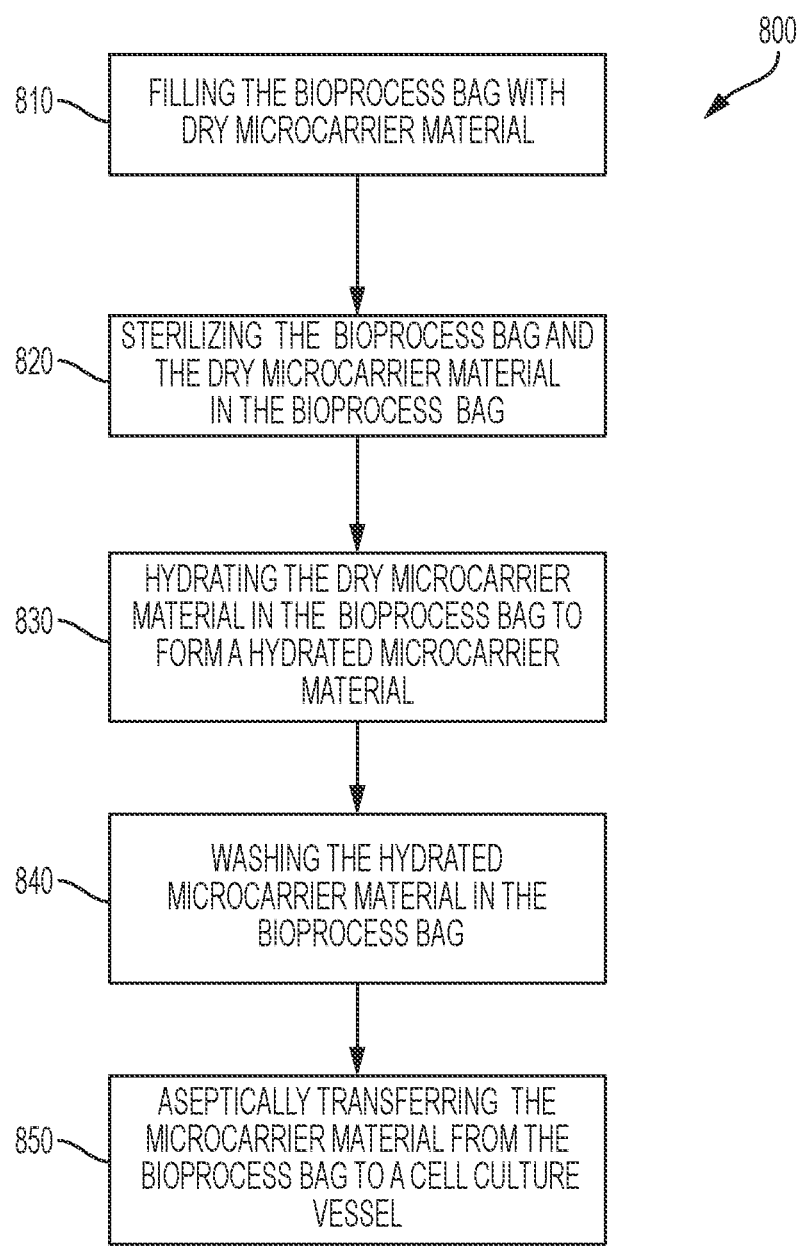
FIG. 10 is a flow chart illustrating a method in accordance with embodiments of the present disclosure.

Provided are also methods for processing dry microcarrier material in bioprocess bags as described herein. FIG. 10 is a flow chart illustrating a method 800 as described herein. The method may include a step 810 of filling the bioprocess bag 100, 1100 with dry microcarrier material. Filling the bioprocess bag 100, 1100 may include unsealing the sealable opening 160 and adding dry microcarrier material through the opening 160 and into the interior compartment of the bioprocess bag 100, 1100. Once dry microcarrier material has been added and the sealable opening 160 is resealed, the method may further include a step 820 of sterilizing the dry microcarrier material in the bioprocess bag 100, 1100. Such sterilizing may be completed using autoclaving, gamma sterilization or any other known sterilization process. Alternatively, the dry microcarrier material and the bioprocess bag 100, 1100 may be sterilized separately prior to filling the bioprocess bag 100, 1100 with the dry microcarrier material. Where the dry microcarrier material is sterilized separately, the method preferably includes aseptically filling the bioprocess bag 100, 1100 using protocols known to persons skilled in the art such as, for example, filling in a clean hood, or otherwise sterile atmosphere, having a HEPA filter. Once filled, the bioprocess bag 100, 1100 may be aseptically stored or transported to a location near a cell culture vessel such as, for example, a bioreactor.

The method may further include a step 830 of hydrating the dry microcarrier material in the bioprocess bag 100, 1100 to form a hydrated microcarrier material. Hydrating the dry microcarrier material may include adding a hydrating fluid into the bioprocess bag 100, 1100 through at least one of the connection apparatuses to contact the hydrating fluid with the dry microcarrier material. Contact with the hydrating fluid results in swelling of the microcarrier material to form hydrated microcarrier material which includes sphere-shaped microcarriers having diameters of about 125 microns to about 300 microns. Once contacted with hydrating fluid, the density of the resulting hydrated microcarrier material allows for settling of the hydrated microcarrier material and formation of at least two separate phases, with the lowest of the at least two separate phases containing the hydrated microcarrier material. After a sufficient amount of settling has occurred, hydrating the dry microcarrier material may further include dispensing the less dense upper phases through the at least one of the connection apparatuses. As used herein, the term "a sufficient amount of settling" refers to a period of time after which an upper liquid phase free of microcarrier material is formed. Dispensing the less dense upper phases includes using a peristaltic pump to pump the less dense upper phases out of the bioprocess bag 100, 1100 to an external container that is aseptically connected to the bioprocess bag 100, 1100. Alternatively, dispensing the less dense upper phases includes applying a pressure to the outside of the bioprocess bag 100, 1100 to push the less dense upper phases out of the bioprocess bag 100, 1100. Optionally, adding a hydrating fluid and dispensing the less dense upper phases may be performed any number of times.

The method may further include a step 840 of washing the hydrated microcarrier material in the bioprocess bag 100, 1100. Washing the hydrated microcarrier material removes excess hydrating fluid from the hydrated microcarrier material and from the bag 100, 1100. Washing the hydrated microcarrier material may include adding fluid and/or other components into the bioprocess bag 100, 1100 through at least one of the connection apparatuses to contact the fluid and/or other components with the hydrated microcarrier material. Once contacted with fluid and/or other components, the density of the resulting hydrated microcarrier material allows for settling of the hydrated microcarrier material and formation of at least two separate phases, with the lowest of the at least two separate phases containing the hydrated microcarrier material. After a sufficient amount of settling has occurred, washing the hydrated microcarrier material may further include dispensing the less dense upper phases through the at least one of the connection apparatuses. Dispensing the less dense upper phases includes using a peristaltic pump to pump the less dense upper phases out of the bioprocess bag 100, 1100. Alternatively, dispensing the less dense upper phases includes applying a pressure to the outside of the bioprocess bag 100, 1100 to push the less dense upper phases out of the bioprocess bag 100, 1100. Optionally, adding fluid and/or other components and dispensing the less dense upper phases may be performed any number of times.

The method may further include a step 850 of aseptically transferring the microcarrier material from the bioprocess bag 100, 1100 to a cell culture vessel such as, for example, a bioreactor. Aseptically transferring the microcarrier material includes inverting the bioprocess bag 100, 1100 such that the half of the bioprocessing bag 100, 1100 having the connector 140 that is an inlet and the connector 140 that is an outlet, or the face port 1140 that is an inlet and the face port 1140 that is an outlet, is positioned at the bottom of the bioprocess bag 100, 1100 such that gravity may be used to facilitate removal of the microcarrier material from the bioprocess bag 100, 1100. Inverting the bioprocess bag 100, 1100 is facilitated, for example, by the holes 150 and/or the at least one rigid rod included on both the top and the bottom of the bioprocess bag 100, 1100. The at least one connection apparatus may be fluidly connected to, for example through tubing and an aseptic connector known to persons skilled in the art, to an inlet of a cell culture vessel.

According to an aspect (1) of the present disclosure, an aseptic bioprocess package is provided. The aseptic bioprocess package comprises a 2D flexible container comprising an interior compartment, a height having an upper half and a lower half, an inlet and an outlet, the inlet and the outlet being disposed on the same half of the 2D flexible container and a channel-forming feature in the interior compartment of the container, the channel-forming feature being configured to maintain a fluid flow path that fluidly connects the interior compartment of the flexible container with the outlet.

According an aspect (2) of the present disclosure, the aseptic bioprocess package of aspect (1) is provided, wherein the 2D flexible container comprises two sheets hermetically sealed along edges of the two sheets to form the interior compartment.

According an aspect (3) of the present disclosure, the aseptic bioprocess package of aspect (2) is provided, wherein the two sheets comprise a film or laminate comprising a polymeric material selected from a group consisting of polyethylene (PE), polypropylene (PP), polyvinyl chloride (PVC), polyethylene terephtalate (PET), polystyrene (PS), polycarbonate (PC), polymethylpentene (PMP), polyetheretherketone (PEEK) polytetrafluoroethylene (PTFE), polyfluoroalkoxy (PFA), polychlorotrifluoroethylene (PCTFE), ethylene vinyl acetate (EVA), and derivatives thereof.

According an aspect (4) of the present disclosure, the aseptic bioprocess package of any of aspects (1)-(3) is provided, wherein the inlet and the outlet comprise connectors having an internal fluid passage that permits the flow of fluids and/or other components into or out of the interior compartment of the flexible container.

According an aspect (5) of the present disclosure, the aseptic bioprocess package of aspect (4) is provided, wherein the connectors comprise rigid plastic.

According an aspect (6) of the present disclosure, the aseptic bioprocess package of aspect (4) is provided, wherein the connectors comprise flexible plastic tubing.

According an aspect (7) of the present disclosure, the aseptic bioprocess package of any of aspects (1)-(6) is provided, wherein the connectors comprise a face port.

According an aspect (8) of the present disclosure, the aseptic bioprocess package of any of aspects (1)-(3) is provided comprising a port fitment having at least two ports, wherein one of the at least two ports is the inlet and another of the at least two ports is the outlet.

According an aspect (9) of the present disclosure, the aseptic bioprocess package of any of aspects (1)-(8) is provided, wherein the channel-forming feature comprises a solid extruded plastic component.

According an aspect (10) of the present disclosure, the aseptic bioprocess package of aspect (9) is provided, wherein the solid extruded plastic component is welded into a seam of the flexible container.

According an aspect (11) of the present disclosure, the aseptic bioprocess package of aspect (9) is provided comprising a plurality of connectors, wherein a first of the plurality of connectors is the inlet, a second of the plurality of connectors is the outlet and the solid extruded plastic component is disposed within a third of the plurality of connectors.

According an aspect (12) of the present disclosure, the aseptic bioprocess package of aspect (9) is provided comprising a port fitment having at least two ports, wherein a first of the at least two ports is the inlet, a second of the at least two ports is the outlet, and the solid extruded plastic component is disposed in a third of the plurality of ports.

According an aspect (13) of the present disclosure, the aseptic bioprocess package of any of aspects (1)-(8) is provided, wherein the channel-forming feature comprises a tubular plastic component.

According an aspect (14) of the present disclosure, the aseptic bioprocess package of aspect (13) is provided, wherein the tubular plastic component is welded into a seam of the flexible container.

According an aspect (15) of the present disclosure, the aseptic bioprocess package of aspect (13) is provided further comprising at least two inwardly facing face ports, wherein a first end of the tubular plastic component is attached to one of the at least two inwardly facing face ports and a second end of the tubular plastic component is attached to another of the at least two inwardly facing face ports.

According an aspect (16) of the present disclosure, the aseptic bioprocess package of aspect (13) is provided comprising a plurality of connectors, wherein a first of the plurality of connectors is the inlet, a second of the plurality of connectors is the outlet and the tubular plastic component is disposed within a third of the plurality of connectors.

According an aspect (17) of the present disclosure, the aseptic bioprocess package of aspect (13) is provided comprising a port fitment having at least two ports, wherein a first of the at least two ports is the inlet, a second of the at least two ports is the outlet, and the tubular plastic component is disposed in a third of the plurality of ports.

According an aspect (18) of the present disclosure, the aseptic bioprocess package of any of aspects (1)-(8) is provided, wherein the channel-forming feature comprises a raised portion which extends from an interior face of at least one of the two sheets.

According an aspect (19) of the present disclosure, the aseptic bioprocess package of aspect (18) is provided, wherein the raised portion comprises a plastic component attached to the interior face of the at least one of the two sheets.

According an aspect (20) of the present disclosure, the aseptic bioprocess package of aspect (18) is provided, wherein the raised portion comprises a textured portion of the interior face of the at least one of the two sheets.

According an aspect (21) of the present disclosure, the aseptic bioprocess package of any of aspects (1)-(7) is provided further comprising a channel-forming feature extender having an opening disposed between a lower extension and an upper extension.

According an aspect (22) of the present disclosure, the aseptic bioprocess package of aspect (21) is provided, wherein the upper extension comprises an interior channel fluidly connecting the opening to the outlet.

According an aspect (23) of the present disclosure, the aseptic bioprocess package of any of aspects (21)-(22) is provided further comprising a side extension comprising an interior channel fluidly connecting the opening to the interior channel of the upper extension.

According an aspect (24) of the present disclosure, the aseptic bioprocess package of aspect (23) is provided, wherein the angle between the side extension and the upper extension is about 90 degrees.

According an aspect (25) of the present disclosure, the aseptic bioprocess package of aspect (23) is provided, wherein the angle between the side extension and the upper extension is greater than about 90 degrees.

According an aspect (26) of the present disclosure, the aseptic bioprocess package of any of aspects (1)-(25) is provided further comprising at least one hanging hole in the top welded edge of the container and at least one hanging hole in the bottom welded edge of the container.

According an aspect (27) of the present disclosure, the aseptic bioprocess package of any of aspects (1)-(25) is provided further comprising a sealable opening in a face of at least one of two sheets of the flexible container.

According an aspect (28) of the present disclosure, the aseptic bioprocess package of aspect (27) is provided, wherein the sealable opening comprises a collar and a sealing cap.

According to an aspect (29) of the present disclosure, a method for processing dry microcarrier material in a microcarrier bioprocess package is provided. The method comprises filling a bioprocess package with dry microcarrier material, the bioprocess package comprising: a 2D flexible container comprising an interior compartment, a height having an upper half and a lower half, an inlet and an outlet, the inlet and the outlet being disposed on the same half of the 2D flexible container; and a channel-forming feature in the interior compartment of the container, the channel-forming feature being configured to maintain a fluid flow path that fluidly connects the interior compartment of the flexible container with the outlet. The method further comprises sterilizing the dry microcarrier material in the bioprocess package, hydrating the dry microcarrier material in the bioprocess package to form a hydrated microcarrier material, washing the hydrated microcarrier material in the bioprocess package, and aseptically transferring the hydrated microcarrier material from the bioprocess package to a cell culture vessel.

According an aspect (30) of the present disclosure, the method of aspect (29) is provided, wherein filling a bioprocess package with dry microcarrier material comprises adding dry microcarrier material to the interior compartment of the bioprocess package.

According an aspect (31) of the present disclosure, the method of aspect (29) is provided, wherein hydrating the dry microcarrier material in the bioprocess package comprises adding a hydrating fluid to the bioprocess package to contact the dry microcarrier material with the hydrating fluid.

According an aspect (32) of the present disclosure, the method of aspect (31) is provided, wherein hydrating the dry microcarrier material in the bioprocess package further comprises forming at least two liquid phases having different densities and dispensing the less dense upper liquid phases from the bioprocess package.

According an aspect (33) of the present disclosure, the method of aspect (29) is provided, wherein washing the hydrated microcarrier material comprises adding fluid and/or other components to the bioprocess package to contact the hydrated microcarrier material with the fluid and/or other components.

According an aspect (34) of the present disclosure, the method of aspect (33) is provided, wherein washing the hydrated microcarrier material further comprises forming at least two liquid phases having different densities and dispensing the less dense upper liquid phases from the bioprocess package.

According an aspect (35) of the present disclosure, the method of aspect (29) is provided, wherein aseptically transferring the hydrated microcarrier material comprises inverting the bioprocess package such that the half of the bioprocess package comprising the inlet and the outlet is positioned at the bottom of the bioprocess package such that gravity facilitates removal of the hydrated microcarrier material from the bioprocess package.

According an aspect (36) of the present disclosure, the method of aspect (29) is provided, wherein aseptically transferring the hydrated microcarrier material comprises fluidly connecting the bioprocess package to the cell culture vessel through an aseptic connector.

While the present disclosure includes a limited number of embodiments, those skilled in the art, having benefit of this disclosure, will appreciate that other embodiments can be devised which do not depart from the scope of the present disclosure

What is claimed is:

1. An aseptic bioprocess package, comprising:
   a 2D flexible container comprising an interior compartment, a height having an upper half and a lower half, an inlet and an outlet, the inlet and the outlet being disposed on the same half of the 2D flexible container; and
   a single channel-forming feature in the interior compartment of the container, the channel-forming feature being configured to maintain a fluid flow path that fluidly connects the interior compartment of the flexible container with the outlet;
   wherein the 2D flexible container comprises two sheets hermetically sealed along edges of the two sheets to form the interior compartment; and
   wherein the channel-forming feature is a singular raised portion that is more rigid than the sheets, which extends from an interior face of at least one of the two sheets to the interior compartment and prevents the two sheets of the 2D flexible container from isolating fluid in the 2D flexible container.

2. The aseptic bioprocess package of claim 1, wherein the two sheets comprise a film or laminate comprising a polymeric material selected from a group consisting of polyethylene (PE), polypropylene (PP), polyvinyl chloride (PVC), polyethylene terephthalate (PET), polystyrene (PS), polycarbonate (PC), polymethylpentene (PMP), polyetheretherketone (PEEK) polytetrafluoroethylene (PTFE), polyfluoroalkoxy (PFA), polychlorotrifluoroethylene (PCTFE), ethylene vinyl acetate (EVA), and derivatives thereof.

3. The aseptic bioprocess package of claim 1, wherein the inlet and the outlet comprise connectors having an internal fluid passage that permits the flow of fluids and/or other components into or out of the interior compartment of the flexible container.

4. The aseptic bioprocess package of claim 3, wherein the connectors comprise rigid plastic.

5. The aseptic bioprocess package of claim 3, wherein the connectors comprise flexible plastic tubing.

6. The aseptic bioprocess package of claim 3, wherein the connectors comprise a face port.

7. The aseptic bioprocess package of claim 1, comprising a port fitment having at least two ports, wherein one of the at least two ports is the inlet and another of the at least two ports is the outlet.

8. The aseptic bioprocess package of claim 1, wherein the channel-forming feature comprises a solid extruded plastic component.

9. The aseptic bioprocess package of claim 8, wherein the solid extruded plastic component is welded into a seam of the flexible container.

10. The aseptic bioprocess package of claim 8 comprising a plurality of connectors, wherein a first of the plurality of connectors is the inlet, a second of the plurality of connectors is the outlet and the solid extruded plastic component is disposed within a third of the plurality of connectors.

11. The aseptic bioprocess package of claim 8 comprising a port fitment having at least three ports, wherein a first of the at least three ports is the inlet, a second of the at least three ports is the outlet, and the solid extruded plastic component is disposed in a third of the at least three ports.

12. The aseptic bioprocess package of claim 1, wherein the channel-forming feature comprises a tubular plastic component.

13. The aseptic bioprocess package of claim 12, wherein the tubular plastic component is welded into a seam of the flexible container.

14. The aseptic bioprocess package of claim 12 further comprising at least two inwardly facing face ports, wherein a first end of the tubular plastic component is attached to one of the at least two inwardly facing face ports and a second end of the tubular plastic component is attached to another of the at least two inwardly facing face ports.

15. The aseptic bioprocess package of claim 12 comprising a plurality of connectors, wherein a first of the plurality of connectors is the inlet, a second of the plurality of connectors is the outlet and the tubular plastic component is disposed within a third of the plurality of connectors.

16. The aseptic bioprocess package of claim 12 comprising a port fitment having at least three ports, wherein a first of the at least three ports is the inlet, a second of the at least three ports is the outlet, and the tubular plastic component is disposed in a third of the at least three ports.

17. The aseptic bioprocess package of claim 1, wherein the raised portion comprises a plastic component attached to the interior face of the at least one of the two sheets.

18. The aseptic bioprocess package of claim 1, wherein the raised portion comprises a textured portion of the interior face of the at least one of the two sheets.

19. The aseptic bioprocess package of claim 1, further comprising a channel-forming feature extender having an opening disposed between a lower extension and an upper extension.

20. The aseptic bioprocess package of claim 19, wherein the upper extension comprises an interior channel fluidly connecting the opening to the outlet.

21. The aseptic bioprocess package of claim 1, further comprising at least one hanging hole in the hermetically sealed edge at one end of the container and at least one hanging hole in the hermetically sealed edge at an opposite end of the container.

22. The aseptic bioprocess package of claim 1, further comprising a sealable opening in a face of at least one of two sheets of the flexible container.

23. The aseptic bioprocess package of claim 22 wherein the sealable opening comprises a collar and a sealing cap.

24. An aseptic bioprocess package, comprising:
- a 2D flexible container comprising an interior compartment, a height having an upper half and a lower half, an inlet and an outlet, the inlet and the outlet being disposed on the same half of the 2D flexible container;
- a channel-forming feature in the interior compartment of the container, the channel-forming feature being configured to maintain a fluid flow path that fluidly connects the interior compartment of the flexible container with the outlet; and
- a channel-forming feature extender having an opening disposed between a lower extension and an upper extension; and
- a side extension comprising an interior channel fluidly connecting the opening to an interior channel of the upper extension;
- wherein the 2D flexible container comprises two sheets hermetically sealed along edges of the two sheets to form the interior compartment;
- wherein the channel-forming feature comprises a singular raised portion that is more rigid than the sheets, which extends from an interior face of at least one of the two sheets to the interior compartment and prevents the two sheets of the 2D flexible container from isolating fluid in the 2D flexible container; and
- wherein the interior channel fluidly connects the opening to the outlet.

25. The aseptic bioprocess package of claim 24, wherein an angle between the side extension and the upper extension is about 90 degrees.

26. The aseptic bioprocess package of claim 24, wherein an angle between the side extension and the upper extension is greater than about 90 degrees.

27. The aseptic bioprocess package of claim 24, further comprising at least one hanging hole in the hermetically sealed edge at one end of the container and at least one hanging hole in the hermetically sealed edge at an opposite end of the container.

28. The aseptic bioprocess package of claim 27, further comprising a sealable opening formed in a face of at least one of the two sheets, wherein the sealable opening comprises a collar and a sealing cap.

29. The aseptic bioprocess package of claim 24, wherein the two sheets comprise a film or laminate comprising a polymeric material selected from a group consisting of polyethylene (PE), polypropylene (PP), polyvinyl chloride (PVC), polyethylene terephtalate (PET), polystyrene (PS), polycarbonate (PC), polymethylpentene (PMP), polyetheretherketone (PEEK) polytetrafluoroethylene (PTFE), polyfluoroalkoxy (PFA), polychlorotrifluoroethylene (PCTFE), ethylene vinyl acetate (EVA), and derivatives thereof.

30. The aseptic bioprocess package of claim 24, wherein the raised portion comprises a plastic component attached to the interior face of the at least one of the two sheets.

\* \* \* \* \*